(12) United States Patent
Gomi et al.

(10) Patent No.: US 8,403,084 B2
(45) Date of Patent: Mar. 26, 2013

(54) FRICTION DRIVE DEVICE AND INVERTED PENDULUM TYPE VEHICLE

(75) Inventors: Hiroshi Gomi, Wako (JP); Kazushi Hamaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/496,515

(22) PCT Filed: Sep. 18, 2009

(86) PCT No.: PCT/JP2009/004759
§ 371 (c)(1),
(2), (4) Date: Mar. 16, 2012

(87) PCT Pub. No.: WO2011/033587
PCT Pub. Date: Mar. 24, 2011

(65) Prior Publication Data
US 2012/0172169 A1 Jul. 5, 2012

(51) Int. Cl.
*B62D 61/00* (2006.01)
(52) U.S. Cl. .............................. 180/21; 180/7.1; 180/10
(58) Field of Classification Search .................. 180/7.1, 180/10, 21
See application file for complete search history.

(56) References Cited

U.S. PATENT DOCUMENTS

| | | | | |
|---|---|---|---|---|
| 2,687,048 A * | 8/1954 | Butler | ............................. | 74/655 |
| 3,260,324 A * | 7/1966 | Suarez | ............................. | 180/10 |
| 5,271,185 A * | 12/1993 | Hosokawa | ..................... | 451/136 |
| 5,322,478 A * | 6/1994 | Bos et al. | ......................... | 474/95 |
| 7,866,429 B2 * | 1/2011 | Ishii et al. | ..................... | 180/218 |
| 8,267,213 B2 * | 9/2012 | Takenaka | ....................... | 180/222 |
| 8,335,612 B2 * | 12/2012 | Tsuji et al. | ....................... | 701/41 |
| 2011/0067936 A1 * | 3/2011 | Takenaka et al. | ............... | 180/21 |
| 2011/0070997 A1 * | 3/2011 | Gomi et al. | ...................... | 476/66 |
| 2011/0209932 A1 * | 9/2011 | Takenaka et al. | ............... | 180/15 |

FOREIGN PATENT DOCUMENTS

| | | |
|---|---|---|
| JP | 10-129517 A | 5/1998 |
| JP | 2004-034960 A | 2/2004 |
| JP | 2005-067334 A | 3/2005 |
| WO | 98/41295 A | 9/1998 |
| WO | 2008/132779 A1 | 11/2008 |
| WO | 2008/139740 A1 | 11/2008 |

* cited by examiner

*Primary Examiner* — Toan To
(74) *Attorney, Agent, or Firm* — Carrier Blackman & Associates, P.C.; Joseph P. Carrier; William D. Blackman

(57) ABSTRACT

The frictional relationship between the drive rollers of a pair of drive disks and the driven rollers of a main wheel is prevented from changing. A connecting mechanism (cross roller bearing) connects the two drive disks to each other so as to be rotatable to each other while restricting at least one of a radial displacement and an axial displacement between the two drive disks.

5 Claims, 8 Drawing Sheets

FRICTION DRIVE DEVICE AND INVERTED PENDULUM TYPE VEHICLE

TECHNICAL FIELD

The present invention relates to a friction drive device and an inverted pendulum type vehicle, and in particular to a friction drive device that can be used as a propulsion unit and an inverted pendulum type vehicle using the same.

BACKGROUND OF THE INVENTION

A known propelling unit for an omni directional vehicle comprises a main wheel including an annular member and a plurality of drive rollers arranged circumferentially along the annular member so as to be rotatable around the tangential axial line thereof at the corresponding position, a pair of drive disks disposed on either lateral side of the main wheel so as to be rotatable around the respective central axial lines and drive rollers mounted on each drive disk so as to be rotatable around an axial line which is in a skewed relationship to the central axial line of the drive disk and engaging the outer circumferential surface of the corresponding driven roller at the outer circumferential surface thereof. See Patent document 1, for instance.

This friction drive device is used as a propulsion unit of an inverted pendulum type vehicle constructed as a unicycle. The two drive disks are rotatably supported by the frame of the inverted pendulum type vehicle, and rotatably support the main wheel by interposing the driven rollers with the left and right sets of the drive rollers from either side.

In the inverted pendulum type vehicle incorporated with this friction drive device, the drive rollers are pushed against the driven rollers so that the rotation of the drive disks is transmitted to the driven rollers via the drive rollers owing to the frictional engagement between the drive rollers and the driven rollers. When the two drive disks are rotatively actuated in the same direction at the same speed, the main wheel rotates around the central axial line thereof. When the drive disks are rotatively actuated in different directions or at different speeds, the driven rollers rotate around the respective central axial lines (around the tangential axial line of the annular member) while the main wheel rotates around the central axial line thereof, or the driven rollers rotate around the respective central axial lines while the main wheel remains stationary. At any event, the vehicle is able to travel in the fore and aft, lateral and oblique directions while maintaining an upright posture by the inverted pendulum control.

PRIOR ART DOCUMENT(S)

Patent Document(s)

Patent document 1: WO 2008/132779

BRIEF SUMMARY OF THE INVENTION

Task to be Accomplished by the Invention

In the friction drive device having the above described structure, to achieve a stable and favorable friction drive properties, it is important that the frictional relationship between the drive rollers of the drive disks and the driven rollers of the main wheel is kept constant, and that the drive rollers and driven rollers are required to be pushed against each other in an optimum fashion. If the drive rollers are pushed against the driven rollers with an excessive force, the driven rollers may not be able to rotate around the axial lines thereof so that the vehicle may not be able to travel laterally or in an oblique direction in an appropriate manner.

In view of such a task in the conventional arrangement, a primary object of the present invention is to provide a friction drive device that can maintain the positional relationship between the two drive disks in an optimum fashion, and can provide a stable and favorable friction drive properties.

Means to Accomplish the Task

To achieve such an object of the present invention, the present invention provides a friction drive device, comprising a main wheel including an annular member and a plurality of driven rollers arranged along a circumference thereof so as to be each rotatable around a tangential direction of the annular member at a part thereof where the driven roller is located, a pair of drive disks located on either side of the main wheel so as to be rotatable around a central axial line thereof and a plurality of drive rollers mounted on each drive disk so as to be rotatable around an axial line in a skewed relationship to the central axial line of the of the drive disk and engage an outer circumferential surface of the corresponding driven roller at an outer circumferential surface thereof: wherein the friction drive device further comprises a connecting mechanism that connects the two drive disks to each other so as to be rotatable to each other while restricting at least one of a radial displacement and an axial displacement between the two drive disks.

In the friction drive device of the present invention, the connecting mechanism preferably includes a roller bearing configured to support at least one of a radial load and an axial load.

In the friction drive device of the present invention, the connecting mechanism preferably includes a spring member that urges the two drive disks axially toward each other.

The friction drive device of the present invention preferably further comprises a spoke assembly that rotatably supports the main wheel with respect to one of the drive disks.

An inverted pendulum type vehicle according to the present invention includes a friction drive device according to any one of the foregoing aspects of the present invention as a propulsion unit.

Effect of the Invention

According to the friction drive device of the present invention, the connecting mechanism connects the two drive disks so as to keep the axial distance between them at a fixed value, and ensure the accuracy of the coaxiality between the two drive disks. Thus, the positional relationship between the two drive disks is kept fixed in a reliable manner. Therefore, the frictional relationship between the drive rollers of the two drive disks and the driven rollers of the main wheel is prevented from changing.

DETAILED DESCRIPTION OF THE PREFERRED EMBODIMENTS

A friction drive device and an inverted pendulum type vehicle according to the present invention are described in the following with reference to FIGS. 1 to 5. In the following description, the orientation and direction of the inverted pendulum type vehicle and components thereof are defined as indicated by the arrows representing the vertical, fore and aft and lateral directions in the drawings.

Figure 1:
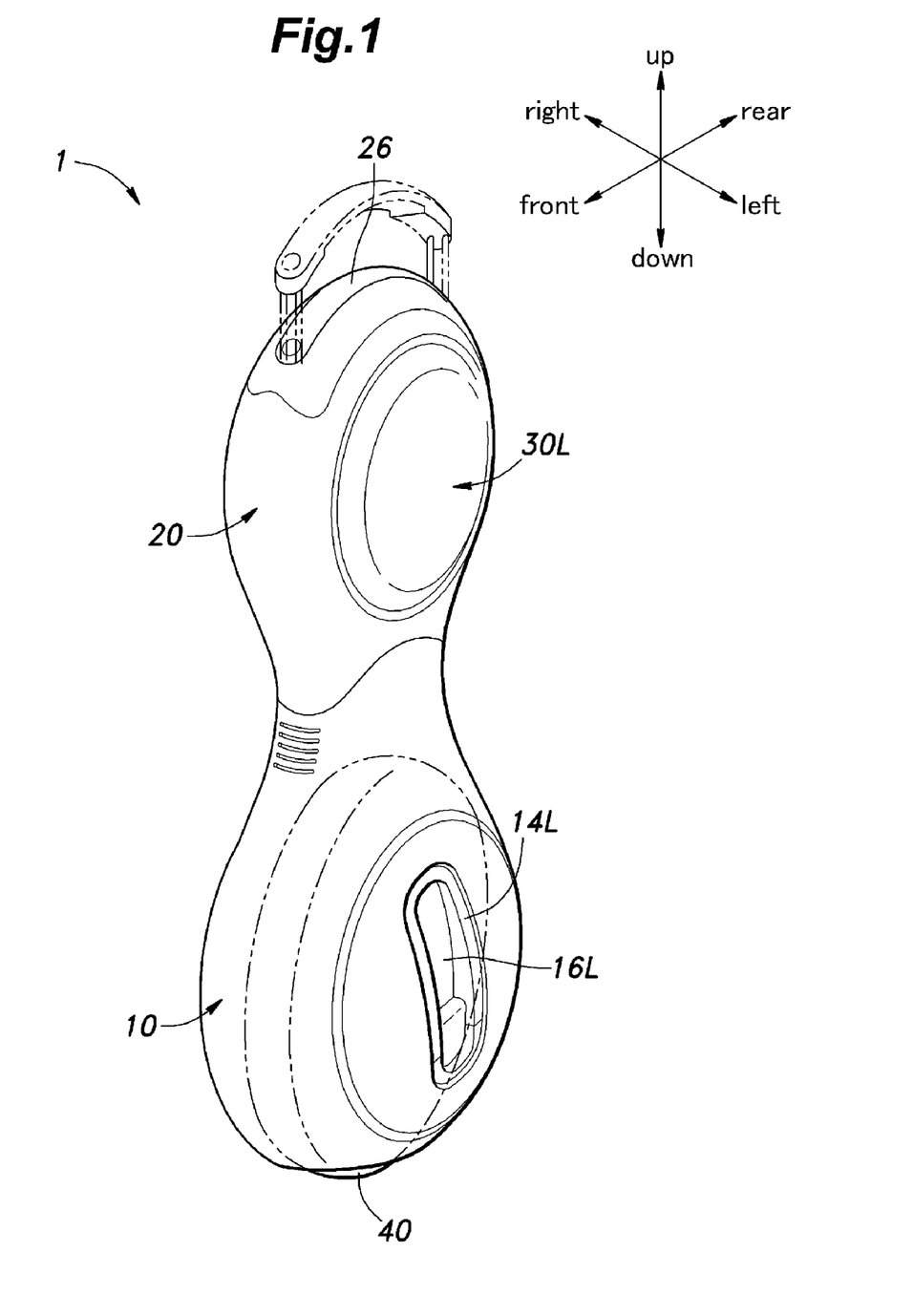
FIG. 1 is a perspective view of an inverted pendulum type vehicle incorporated with a friction drive device given as a first embodiment of the present invention when a saddle and a step are both retracted.
Figure 2:
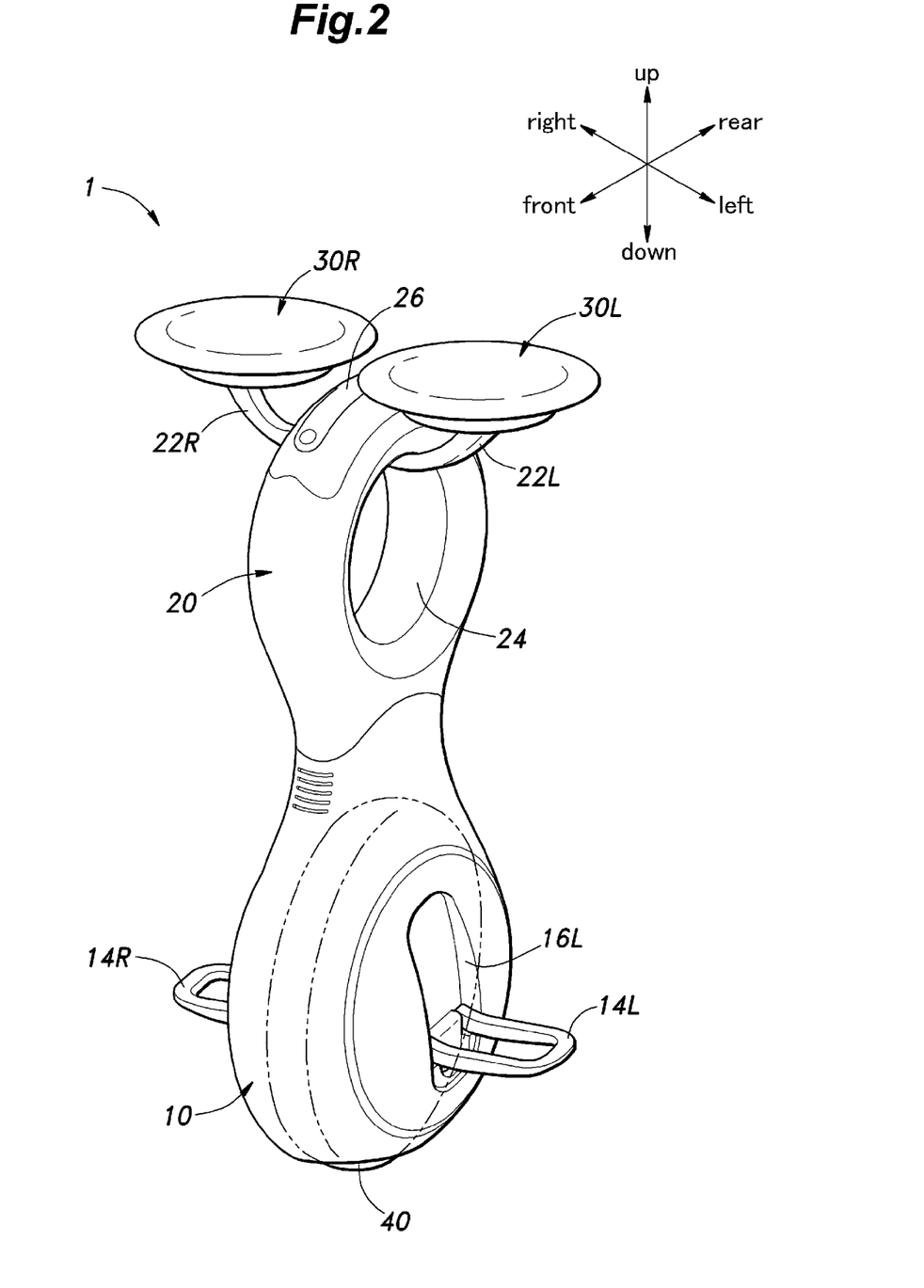
FIG. 2 is a perspective view similar to FIG. 1 when the saddle and the step are both deployed.

Referring to FIGS. 1 and 2, the overall structure of the inverted pendulum type vehicle including the friction drive device embodying the present invention as a propulsion unit thereof is described in the following. The inverted pendulum type vehicle includes a lower frame 10 and an upper frame 20 which are connected to each other.

The lower frame 10 supports a propulsion unit 40. The propulsion unit 40 is constructed as a unicycle which is configured to hold both the lower frame 10 and the upper frame 20 in an upright posture by an inverted pendulum control using an internal gyroscope and a load sensor (not shown in the drawings), and is enabled to travel in the fore and aft, lateral and oblique directions.

A pair of steps 14L and 14R are provided on either side of the lower frame 10 so as to be raised and retracted as required. FIG. 1 shows the two steps 14L and 14R received in step storage portions 16L and 16R formed on either side of the lower frame 10, respectively, and FIG. 2 shows the two steps 14L and 14R raised from the step storage portions 16L and 16R to the horizontal position.

A pair of saddle parts 30L and 30R are provided on either side of the upper frame 20 in a retractable manner via curved saddle arms 22L and 22R, respectively, and jointly forms a saddle 30. A retractable grip handle 26 is provided in the upper frame 20 to enable a user to transport or carry the vehicle.

Each saddle part 30L, 30R is formed as a seat for individually supporting a hip and thigh of a rider, and is given with a circular shape as seen in plan view. FIG. 1 shows the saddle 30 (the saddle parts 30L and 30R) stored in a saddle storage space 24 consisting of a cylindrical space passed laterally across the upper frame 20, and FIG. 2 shows the saddle parts 30L and 30R deployed to the horizontal position by being raised from the saddle storage space 24 via the saddle arms 22L and 22R, respectively.

Figure 3:
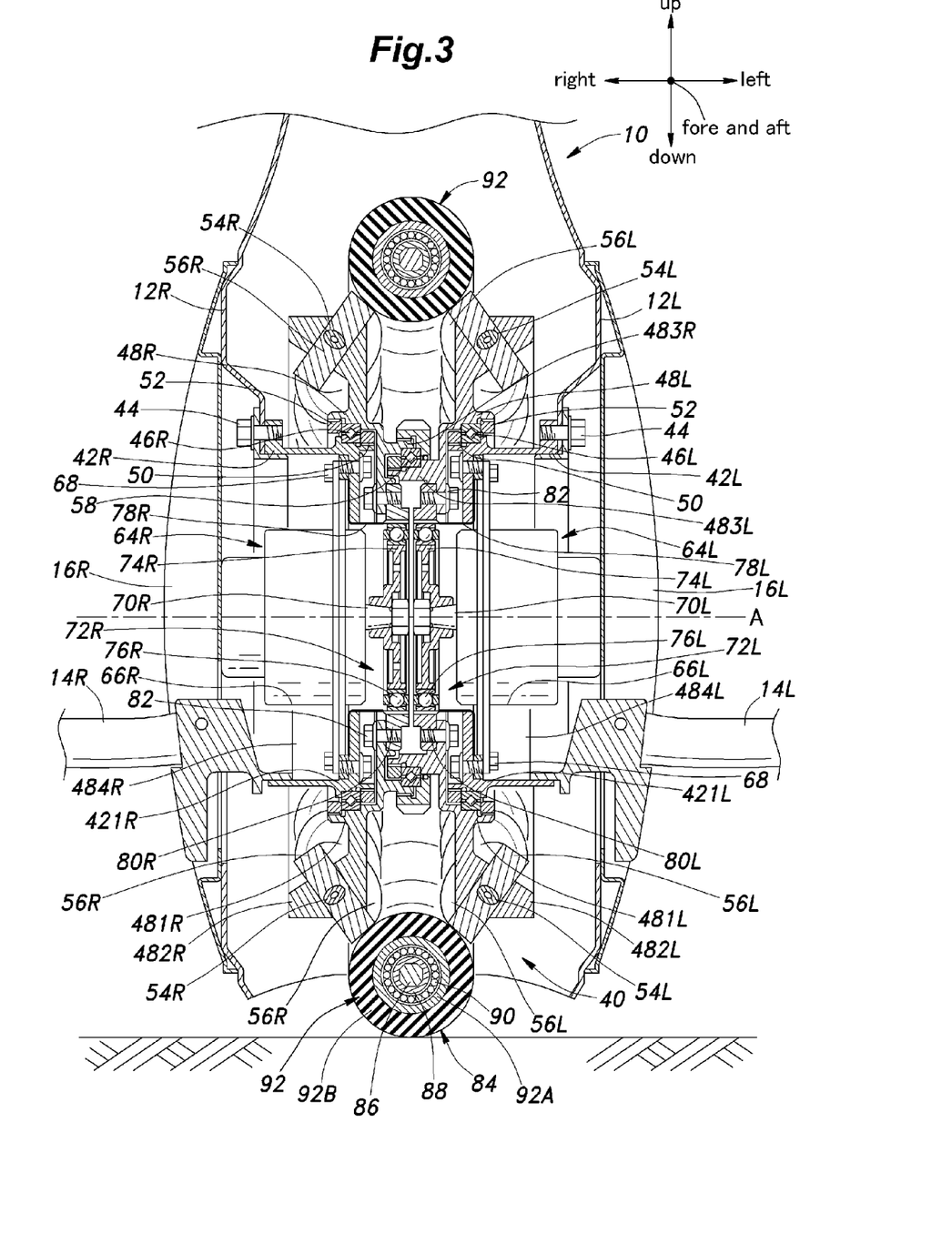
FIG. 3 is a vertical sectional view of the friction drive device of the first embodiment.

The propulsion unit (friction drive device) 40 embodying the present invention is now described in the following with reference to FIGS. 3 and 4.

The lower frame 10 is provided with a left side wall 12L and a right side wall 12R laterally opposing each other in a space apart relationship, and the propulsion unit 40 is disposed between the left side wall 12L and the right side wall 12R of the lower frame 10.

The propulsion unit 40 is provided with a pair of mounting members 42L and 42R each having a cylindrical shape. The mounting members 42L and 42R are fixedly attached to the inner surface of the left side wall 12L and the right side wall 12R, respectively, by using threaded bolts 44. The two mounting members 42L and 42R share a common central axial line A extending laterally. In other words, the two mounting members 42L and 42R are fixed to the lower frame 10 in a coaxial relationship with the central axial line A.

Each mounting member 42L, 42R rotatably supports an annular drive disk 48L, 48R on the outer circumferential thereof via a cross roller bearing 46L, 46R. Each cross roller bearing 46L, 46R consists of a roller bearing that can withstand both the radial and axial (thrust) loads, and is axially fixed to the mounting member 42L, 42R and the drive disk 48L, 48R by fastening rings 50 and 52 that are threaded to the outer circumferential surface of a cylindrical portion 421L, 421R of the mounting member 42L, 42R and to the inner circumferential surface of a cylindrical portion 481L, 481R of the drive disk 48L, 48R, respectively.

Each drive disk 48L, 48R is provided with an outer annular portion 482L, 482R having a greater diameter than the cylindrical portion 481L, 481R. A plurality of drive rollers 56L, 56R are supported by each drive disk 48L, 48R via respective roller shafts 54L, 54R in a rotatable manner. Each drive roller 56L, 56R may be made of highly stiff material such as metal and hard plastic. The drive rollers 56L, 56R are arranged at a regular angular interval along the circumference of the corresponding outer annular portion 482L, 482R, and are rotatable around the corresponding roller shafts 54L, 54R.

The two sets of roller shafts 54L and 54R are symmetrically disposed to each other, and extend in a skewed relationship to the central axial line A. Therefore, the drive rollers 56L and 56R supported by the roller shafts 54L and 54R are arranged like teeth of helical gears.

Figure 5:
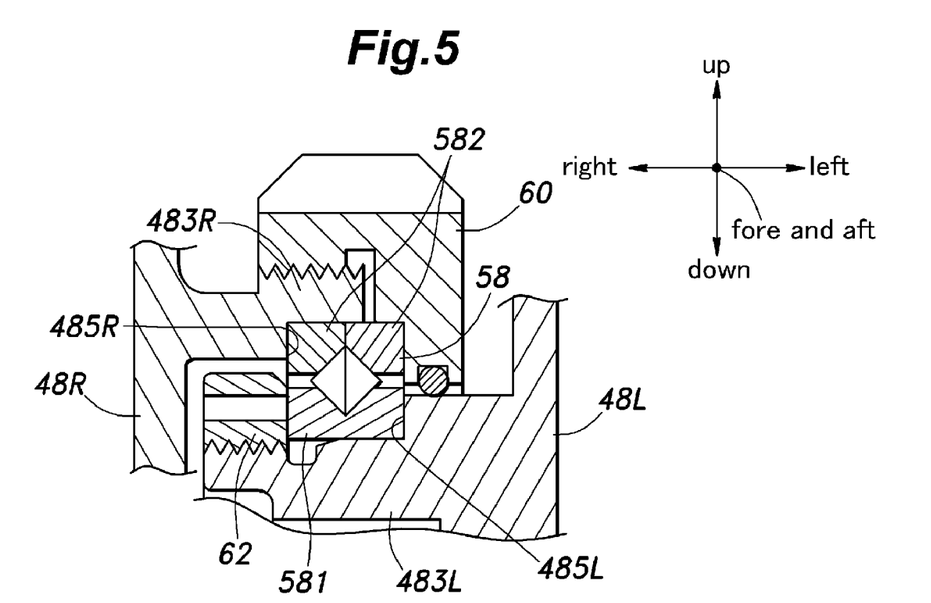
FIG. 5 is an enlarged vertical sectional view of an essential part of the friction drive device of the first embodiment.

Each drive disk 48L, 48R is provided with a cylindrical extension 483L, 483R extending toward each other. The two cylindrical extensions 483L and 483R are connected to each other by a cross roller bearing 58 in a relatively rotatable manner. The cross roller bearing 58 consists of a roller bearing that can withstand both the radial and axial (thrust) loads, and, as best shown in FIG. 5, is fitted onto the outer circumferential surface of one of the cylindrical extensions 483L at an inner race 581 thereof, and into the inner circumferential surface of the other cylindrical extension 483R at an outer race 582 thereof.

The inner race 581 is pushed against a shoulder surface 485L of the cylindrical extensions 483L to be axially positioned on the cylindrical extensions 483L by a fastening ring 62 threaded to the outer periphery of the cylindrical extension 483L. The outer race 582 is pushed against a shoulder surface 485R of the cylindrical extension 483R to be axially positioned on the cylindrical extensions 483R by a fastening ring 60 threaded to the outer periphery of the cylindrical extensions 483R.

The cross roller bearing 58 forms a main part of a connecting mechanism for connecting the two drive disks 48L and 48R in a relatively rotatable manner, and the assembling of the cross roller bearing 58 with the two drive disks 48L and 48R causes the both radial and axial relative displacement between the two drive disks 48L and 48R to be restricted. In other words, the cross roller bearing 58 connects the two drive disks 48L and 48R such that that the two drive disks 48L and 48R are relatively rotatable to each other in a coaxial relationship, and relatively immobile in the axial direction.

Thereby, the precision in the coaxiality of the two drive disks 48L and 48R is ensured, and the axial distance between the two drive disks 48L and 48R is kept fixed to a prescribed value.

An electric motor 64L, 64R is received in a cylindrical space 484L, 484R defined inside the cylindrical portion 484L, 484R of each drive disk 48L, 48R. Each electric motor 64L, 64R includes an outer housing 66L, 66R incorporated with a stator coil (not shown in the drawings) and fixedly secured to the corresponding mounting member 42L, 42R by using threaded bolts 68. Each electric motor 64L, 64R is coaxially disposed with respect to the central axial line A, and is provided with a rotor shaft 70L, 70R extending toward each other.

To the free end of each rotor shaft 70L, 70R is fixedly connected a wave plug 74L, 74R (which will be described hereinafter) of a wave gear device (harmonic drive device) 72L, 72R. The wave gear device 72L, 72R is of a per se known type, and comprises a highly stiff wave plug 74L, 74R having an elliptic profile and serving as an input member, a wave bearing 76L, 76R fitted on the outer periphery of the wave plug 74L, 74R, a flexible external teeth member 78L, 78R consisting of a flanged cylindrical shell which is frictionally engaged by the outer circumferential surface of the wave bearing 76L, 76R and is provided with external teeth on the outer circumferential surface thereof and a highly stiff annular internal teeth member 80L, 80R having internal teeth meshing with the external teeth of the external teeth member 78L, 78R. The internal teeth member 80L, 80R serves as an output member, and fixedly attached to the corresponding drive disk 48L, 48R by using threaded bolts 82.

Thus, the rotational output of each electric motor 64L, 64R is reduced in speed by the corresponding wave gear device 72L, 72R, and is individually transmitted to the corresponding drive disk 48L, 48R.

The wave plug 74L, 74R, the wave bearing 76L, 76R and the internal teeth member 80L, 80R are received in the internal space of the cylindrical extension 483L and 483R of the corresponding drive disk 48L, 48R. Owing to this fact along with the fact that the electric motor 64L, 64R is received in the internal space of the cylindrical extension 481L and 481R of the corresponding drive disk 48L, 48R, the axial dimension of the propulsion unit 40 is minimized.

A main wheel 84 is interposed between the two annular sets of drive rollers 56L and 56R supported by the respective drive disks 48L and 48R so as to be supported on a same or a substantially same central axial line as the central axial line A. In other words, the main wheel 84 is interposed between the drive rollers 56L and 56R that are arranged annularly along the circumference of the corresponding drive disks 48L and 48R so as to be rotatable around a same or a substantially same central axial line as the central axial line A without any shaft supporting the main wheel 84.

The main wheel 84 comprises an endless annular member 86 having a polygonal cross section, a plurality of inner sleeves 88 fitted on the annular member 86 and a plurality of driven rollers 92 rotatably supported by the corresponding inner sleeves 88 via a ball bearing 90. The driven rollers 92 are configured to engage the road surface, and each comprises a metallic cylinder 92A fitted onto the corresponding ball bearing 90 and a rubber cylinder 92B vulcanized on the outer periphery of the metallic cylinder 92A.

The driven rollers 92 and the inner sleeves 88 are arranged along the circumference of the annular member 86, and are each rotatable around the tangential direction of the annular member 86 at the corresponding position.

Each drive roller 56L, 56R engages the outer circumferential surface of the rubber cylinder 92B of the corresponding driven roller 92, defining the effective outer circumferential surface of the main wheel 84, by the outer circumferential surface thereof so that the rotation (propelling force) of the corresponding drive disk 48L, 48R is frictionally transmitted to the driven roller 92.

The relationship (numbers) between the driven rollers 92 and the drive rollers 56L and 56R is selected in such a manner that the driven roller 92 engaging the floor or road surface is always engaged by at least one each of the left and right drive rollers 56L and 56R. Therefore, the driven roller 92 engaging the floor surface can receive a propelling (rotational) force from the drive rollers 56L and 56R at all times.

The drive rollers 56L and 56R are each supported so as to be rotatable around a central axial line which is neither perpendicular nor parallel to the central axial line (wheel center) of the main wheel 84 or the tangential direction of the driven wheel 92 at the point of contact with the drive roller 56L, 56R. In other words, the drive rollers 56L and 56R are each provided with a rotational axial line which is tilted with respect to the rotational direction of the main wheel 84 around the central axial line thereof, and tilted with respect to the rotational axial line of the drive disk 48L, 48R. Therefore, each drive roller 56L, 56R is provided with a rotational plane which is neither parallel nor perpendicular to the central axial line of the drive disk 48L, 48R.

More specifically, the central axial line of each driven roller 92 crosses the central axial line of each of the corresponding drive rollers 56L and 56R at the point of contact. In other words, on the projection plane perpendicular to the central axial line of each driven roller 92, the central axial line of each of the drive rollers 56L and 56R is tilted with respect to the central axial line of the driven roller 92 at a prescribed tilt angle. The central axial line of each drive roller 56L, 56R is tilted with respect to the radial line of the annular member 86 defining the central axial line of each driven roller 92 by a certain angle and is also tilted with respect to a hypothetical plane tangential to the cross sectional center line of the annular member 86. The arrangement of the drive rollers 56L and 56R on the drive disks 48L and 48R is similar to that of the teeth of a helical cone gear formed on a cone surface having a certain cone angle. For more details on this subject matter, reference should be made to WO2008/139740.

In this embodiment, when the two drive disks 48L and 48R are actuated in different rotational directions and/or at different rotational speeds by appropriately controlling the electric motors 64L and 64R, a component of force which is perpendicular to the circumferential (tangential) force acts on the contact surface between the drive roller 56L, 56R and the driven roller 92. This component of force acts on the outer surface of the driven roller 92 as a twisting force so that the driven roller 92 is caused to rotate around the central axial line thereof.

The rotation of the driven rollers 92 is determined by the rotational speed difference between the two drive disks 48L and 48R. For instance, when the two drive disks 48L and 48R are rotated at a same speed in opposite directions, the main wheel 84 remains stationary, and only the driven wheels 92 are rotated around the central axial line thereof. As a result, the main wheel 84 produces a lateral propelling force, and the inverted pendulum vehicle is caused to move laterally.

On the other hand, when the two drive disks 48L and 48R are rotated at a same speed in a same direction, the drive rollers 92 do not rotate around the central axial line thereof, and the main wheel 84 rotates around the central axial line thereof. As a result, the inverted pendulum vehicle is caused to move forward or backward (in the fore and aft direction).

By individually controlling the rotational speeds and rotational directions of the two drive disks 48L and 48R by using the electric motors 64L and 64R, the inverted pendulum type vehicle is enabled to travel in any desired direction on the road surface.

According to the foregoing structure, the cross roller bearing 58 that forms the main part of the connecting mechanism allows the axial distance between the two drive disks 48L and 48R to be maintained at a fixed value, and connects the two drive disks 48L and 48R in a relatively rotatable manner to each other and in a coaxial relationship so that the precision of the coaxiality between the two drive disks 48L and 48R is ensured, and the relative position between the two drive disks 48L and 48R can be fixed in a reliable manner without the fear of changing in operation.

Thereby, the two drive disks 48L and 48R are prevented from axially moving relative to each other or deviating from the common axial line even when the inverted pendulum type vehicle 1 is subjected to the load of the rider or the like. Therefore, the state of fictional contact between the drive rollers 56L and 56R and the driven rollers 92 is free from variations, and can be kept in the optimum condition at all times so that the inverted pendulum type vehicle 1 is allowed to operate in an appropriate manner under the prescribed condition at all times.

Also, by appropriately determining the axial distance between the two drive disks 48L and 48R defined by the cross roller bearing 58, the contact pressure between the drive rollers 56L and 56R and the driven rollers 92 can be set to an appropriate value. This allows the contact pressure to be determined at a high precision as compared to the case where the contact pressure is adjusted from an axially outer part of the drive disks 48L and 48R.

Figure 4:
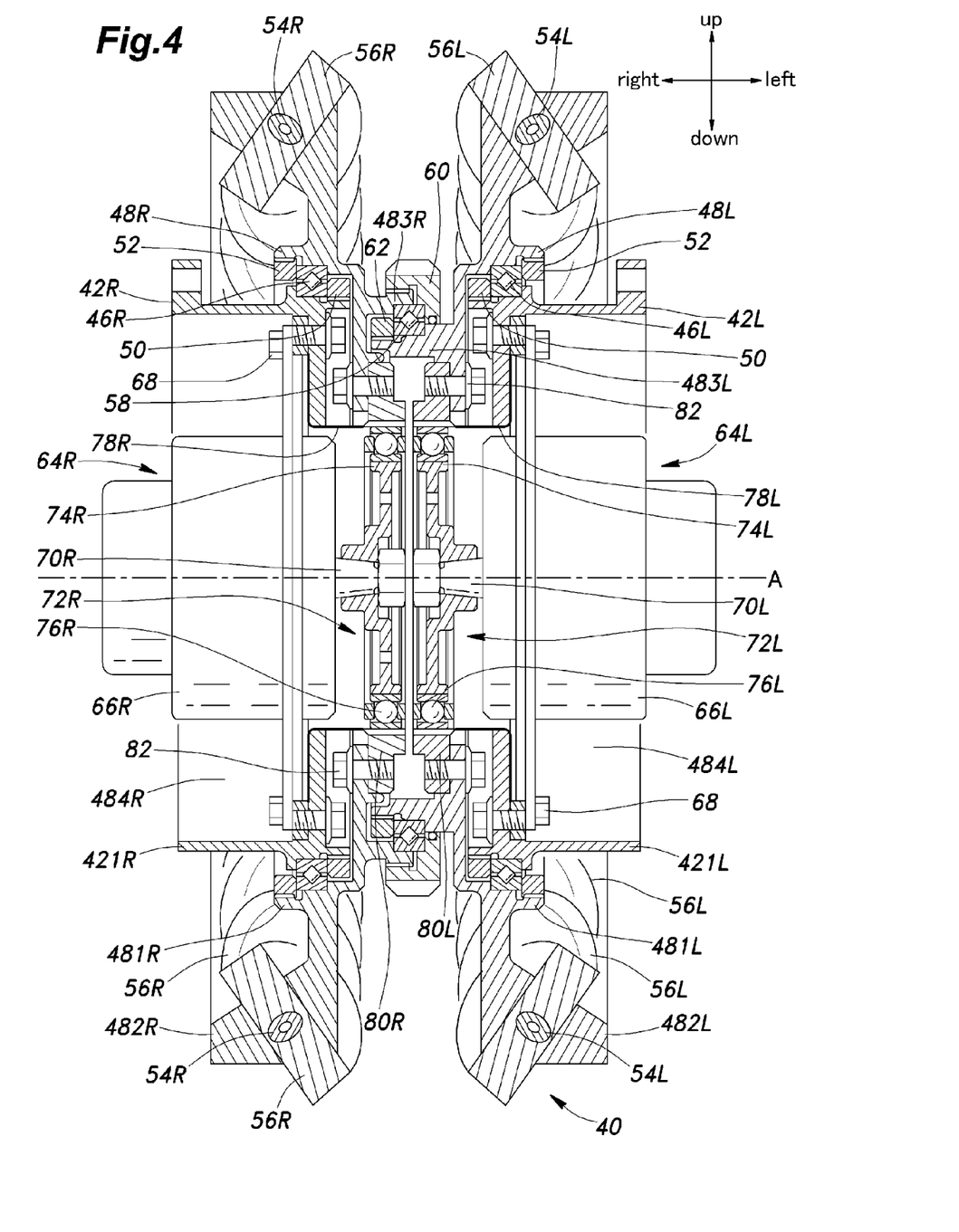
FIG. 4 is an enlarged vertical sectional view of a drive unit part of the friction drive device of the first embodiment.

Because the two drive disks 48L and 48R are connected to each other by the cross roller bearing 58, the two drive disks 48L and 48R can be handled as a single assembly as illustrated in FIG. 4. Therefore, the work efficiency in assembling and dissembling the drive disks 48L and 48R can be improved.

The connecting mechanism is not limited by the one used in the foregoing embodiment, but may also be any other mechanism as long as the mechanism can limit the axial movement of the drive rollers 56L and 56R toward each other to avoid the drive rollers 56L and 56R from being excessively pressed against the driven rollers 92.

Figure 6:
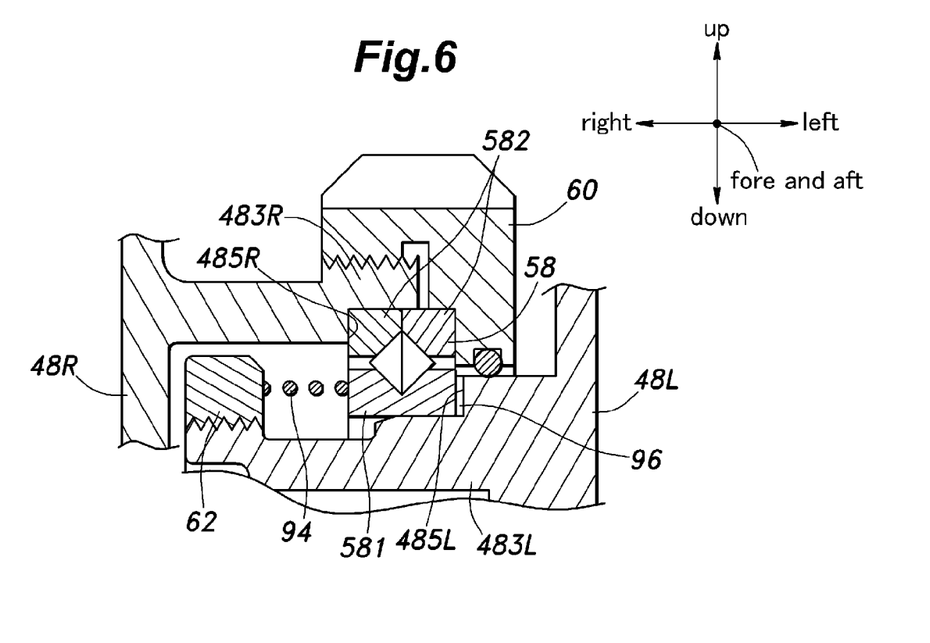
FIG. 6 is an enlarged vertical sectional view of an essential part of a friction drive device given as a second embodiment of the present invention.

FIG. 6 shows another embodiment of a friction drive device according to the present invention. In FIG. 6, the parts corresponding to those shown in FIG. 5 are denoted with like numerals without repeating the description of such parts.

In this embodiment, an axial gap 96 is defined between the cross roller bearing 58 and the shoulder surface 485L of the left drive disk 48L, and a compression coil spring 94 is interposed between the fastening ring 62 and the inner race 581 of the cross roller bearing 58 in a pre-stressed state.

In this embodiment, the drive disks 48L and 48R are resiliently urged toward each other under the spring force of the compression coil spring 94 so that the two drive disks 48L and 48R are allowed to move axially toward each other within a range permitted by the gap 96 without any rattling. The resulting displacement is caused in dependence on the wear of the rubber part of the driven rollers 92.

Therefore, even when the rubber part of the driven rollers 92 wears out, the state of the frictional engagement between the drive rollers 56L and 56R and the driven rollers 92 can be maintained in an optimum condition.

Figure 7:
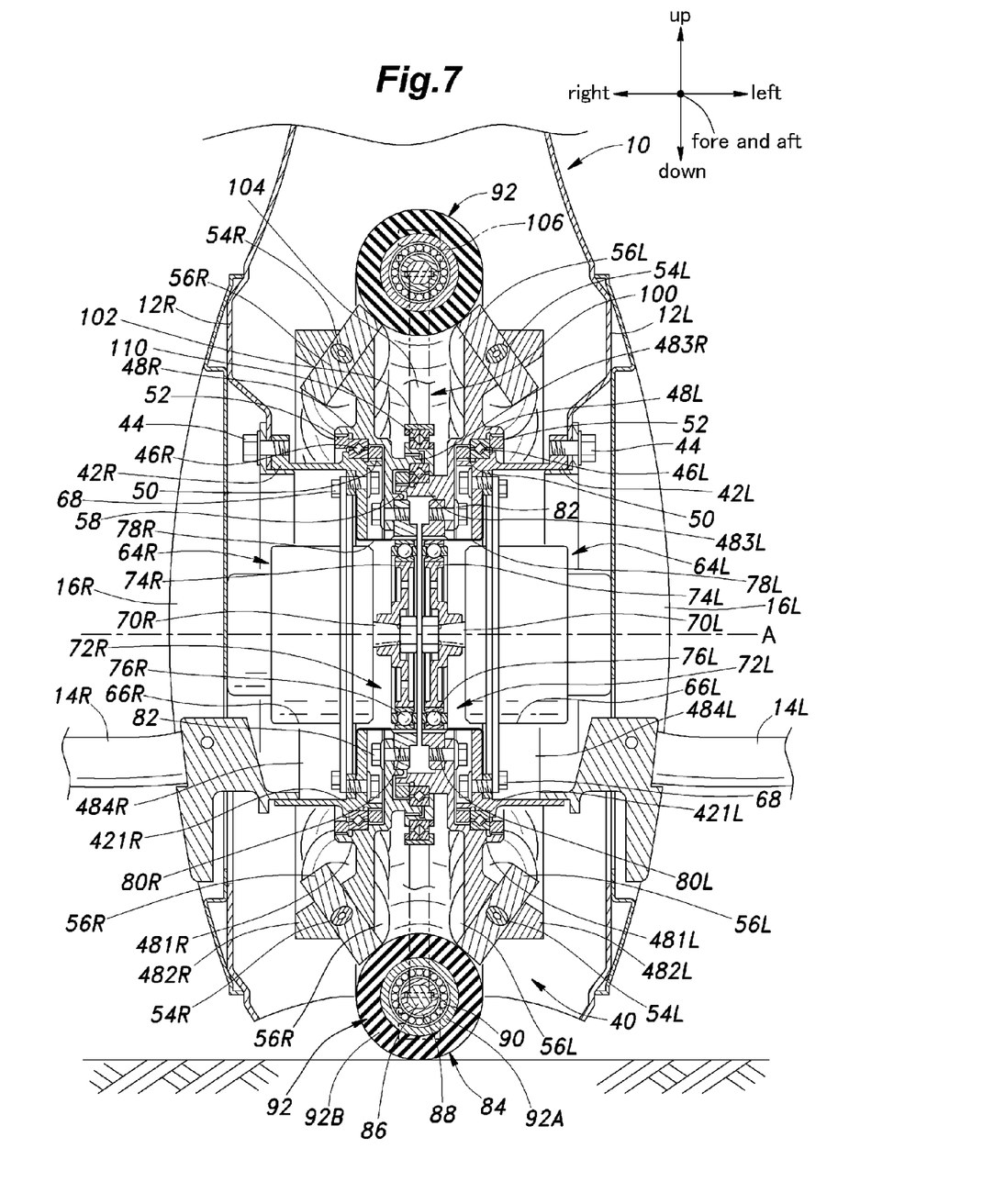
FIG. 7 is a vertical sectional view of a friction drive device of a third embodiment.
Figure 8:
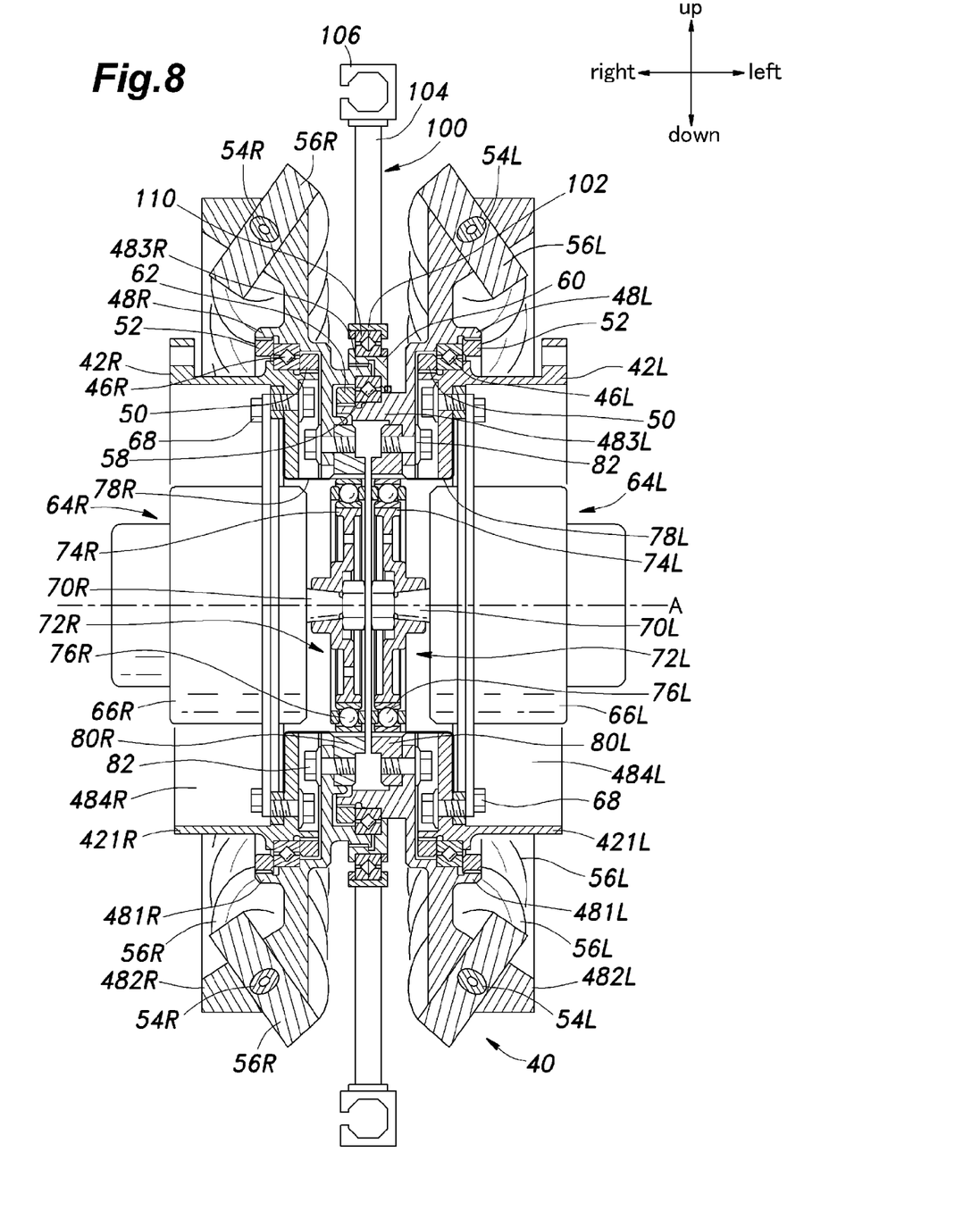
FIG. 8 an enlarged vertical sectional view of an essential part of the friction drive device of the third embodiment.

Yet another embodiment of a friction drive device according to the present invention is described in the following with reference to FIGS. 7 and 8. In FIGS. 7 and 8, the parts corresponding to those in FIGS. 3 and 4 are denoted with like numerals without repeating the description of such parts.

In this embodiment, a hub 102 of a spoke assembly 100 is supported on the outer periphery of the fastening ring 60, provided between the two drive disks 48L and 48R, via a cross roller bearing 110 so as to be rotatable around an axial line coaxial to the central axial line A. A plurality of spoke members 104 extend radially from the hub 102. Each spoke member 104 is fixedly connected to the hub 102 at one end thereof, and fixedly engaged by the annular member 86 via a hook member 106 formed in the other end thereof. The hook member 106 is engaged with a part of the annular member 86 of the main wheel 84 located in a space between the corresponding changing circumferentially adjoining drive rollers 92.

According to this structure, the main wheel 84 is supported by the two drive disks 48L and 48R so as to be rotatable around the common central axial line so that the main wheel 84 can be held at the prescribed position in a stable manner, and is protected from excessive load.

10 lower frame
14L, 14R step
20 upper frame
30L, 20R saddle part (saddle)
40 propulsion unit
42L, 42R mounting member
48L, 48R drive disk
56L, 56R drive rollers
58 cross roller bearing
64L, 64R electric motor
72L, 72R wave gear device
inverted pendulum type vehicle
84 main wheel
86 annular member
92 driven roller
94 compression coil spring
100 spoke assembly

The invention claimed is:

1. A friction drive device, comprising a main wheel including an annular member and a plurality of driven rollers arranged along a circumference thereof so as to be each rotatable around a tangential direction of the annular member at a part thereof where the driven roller is located, a pair of drive disks located on either side of the main wheel so as to be rotatable around a central axial line thereof and a plurality of drive rollers mounted on each drive disk so as to be rotatable around an axial line in a skewed relationship to the central axial line of the of the drive disk and engage an outer circumferential surface of the corresponding driven roller at an outer circumferential surface thereof;
wherein the friction drive device further comprises a connecting mechanism that connects the two drive disks to each other so as to be rotatable to each other while restricting at least one of a radial displacement and an axial displacement between the two drive disks.

2. The friction drive device according to claim 1, wherein the connecting mechanism includes a roller bearing configured to support at least one of a radial load and an axial load.

3. The friction drive device according to claim 1, wherein the connecting mechanism includes a spring member that urges the two drive disks axially toward each other.

4. The friction drive device according to claim 1, further comprising a spoke assembly that rotatably supports the main wheel with respect to one of the drive disks.

5. An inverted pendulum type vehicle including the friction drive device according to claim 1 as a propulsion unit.

* * * * *